H. CSANYI.
ART OF PRODUCING CHARGES FOR POWER DEVICES.
APPLICATION FILED MAY 13, 1918.
1,333,838.
Patented Mar. 16, 1920.
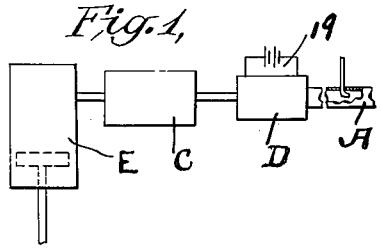
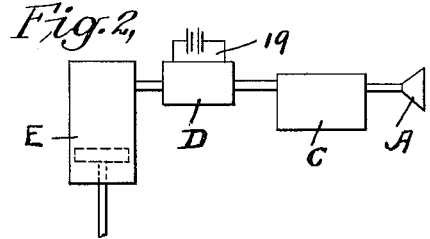
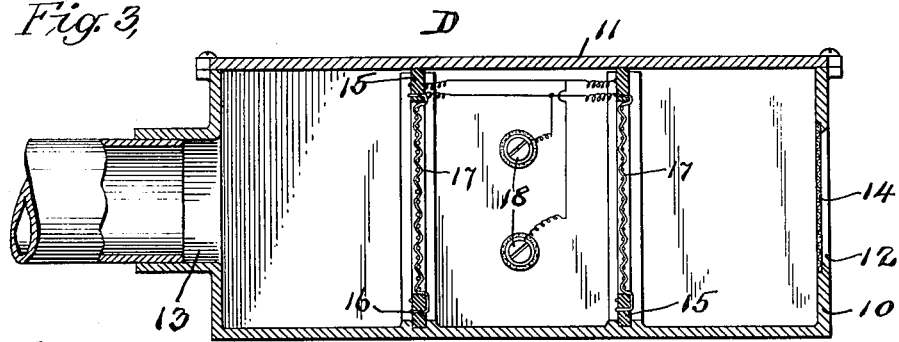
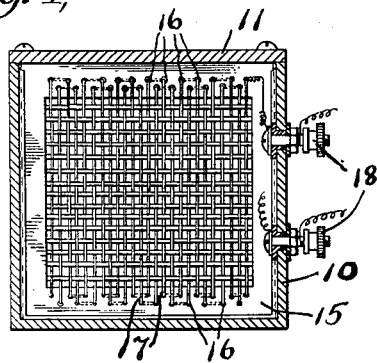
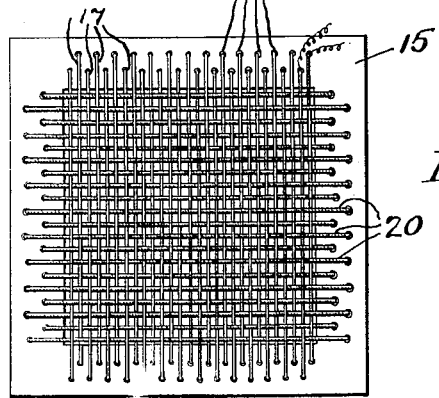
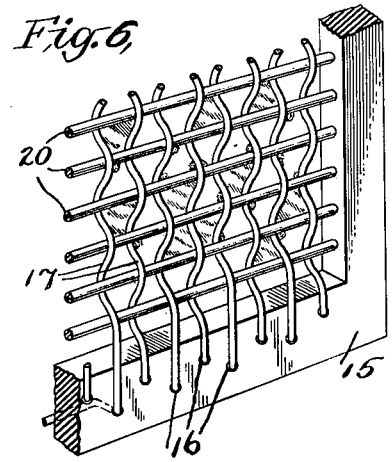
INVENTOR
Henry Csanyi,
BY Meyers, Cushman +Rea
ATTORNEYS.

UNITED STATES PATENT OFFICE.

HENRY CSANYI, OF NEW YORK, N. Y.

ART OF PRODUCING CHARGES FOR POWER DEVICES.

1,333,838.  Specification of Letters Patent.  Patented Mar. 16, 1920.

Application filed May 13, 1918. Serial No. 234,093.

*To all whom it may concern:*

Be it known that I, HENRY CSANYI, a citizen of the United States, residing at New York, in the county of New York and State of New York, have invented new and useful Improvements in the Art of Producing Charges for Power Devices, of which the following is a specification.

This invention relates to the art of producing charges for power devices, pertaining more particularly to the production of the oxygen content of such charges from moisture-laden air currents.

In companion applications filed Feb. 28, 1918, and March 2, 1918, bearing the respective serial numbers of 219,687 and 220,050, I have disclosed new and improved methods and apparatus for producing charges for power devices, the invention of the said applications operating under the general principles of subjecting moisture-laden air currents to decomposing treatment while *en route* to the point of combustion for the purpose of augmenting the oxygen of the atmospheric content by the oxygen of the moisture content of the currents being treated. This general action is provided by interposing within the suction line leading to the power device—the latter being illustrated as of the internal combustion type—a unit which is effective to decompose the moisture content which may be contained within the currents flowing within the suction line, the unit, however, being designed or located to be ineffective upon the hydrocarbon content which may be introduced into the flowing currents in the formation of the charge. In said applications, the unit is of the general type of an electrolytic cell employing spaced plates as the electrodes, these plates being connected up to the opposite sides of a battery or other source of current supply, the spacing of the plates being such that as the air currents are drawn lengthwise of the plate faces and through the spaces between the plates, any moisture content which may be contained within the currents will be subjected to decomposing action, thereby changing the moisture into its component elements or gases. For instance, with the moisture in the form of $H_2O$, the decomposing action operates to change the moisture into its oxygen and hydrogen content, the oxygen content augmenting the similar content of the air current and thereby increasing the oxygen content of the charge.

The present invention is designed to facilitate the decomposing action by varying the form of the moisture content, and, in addition, relates to the construction and formation of the decomposing unit, the construction and arrangement of the unit being simplified and of decreased cost of manufacture. One feature of the change consists in substituting for the plate pack or pile formation a screen-like structure—which may be termed an electrode screen—a plurality of these structures being preferably utilized, and the invention also contemplates the production of these screen-like structures as individual articles of manufacture, being of a form which permits ready substitution of one structure for another.

To these and other ends, the nature of which will be readily understood as the invention is hereinafter disclosed, said invention consists in the improved methods and construction and combination of parts hereinafter fully described, illustrated in the accompanying drawings, and more particularly pointed out in the appended claims.

In the accompanying drawings, in which similar reference characters indicate similar parts in each of the views:—

Figures 1 and 2 are diagrammatic views indicating generally the suction line leading to a power device where the general principles of the prior application are employed, Fig. 1 indicating the manner in which the decomposing unit may be mounted where the charge is provided under the usual carbureting practice, Fig. 2 indicating the manner of mounting the unit where the form of hydrocarbon supply is varied from the general practice.

Fig. 3 is a vertical longitudinal sectional view taken through a unit constructed according to the present invention.

Fig. 4 is a transverse sectional view of the same.

Fig. 5 is a view in elevation showing a modified form of screen.

Fig. 6 is a detail diagrammatic view showing the form of moisture content at the time of decomposing action.

Referring more particularly to Fig. 1, which represents diagrammatically the general suction line arrangement set forth in the companion application Ser. No. 219,687, A represents the air intake, E a cylinder of the power device, C the carbureter, and D the decomposing unit, the latter being located in the line in advance of the carbureter. The intake A is shown as provided with a nozzle which may be utilized in introducing moisture into the incoming air, but this is simply representative, the invention contemplating use under conditions where the air supply normally contains more or less moisture. In this arrangement, the moisture-laden air first reaches the decomposing unit in which the decomposing action on the moisture takes place, thus augmenting the oxygen supply, the air currents then passing the carbureting apparatus and entering the cylinder.

In Fig. 2, which pertains more particularly to the invention as disclosed in the companion application Ser. No. 220,050, the position of the decomposing unit is changed to a point between the carburetor and the cylinder, the carbureting structure in this form being designed more particularly for utilizing heavier oils, the hydrocarbon for the charge being produced from the oil in such form as to contain a moisture content, the suction line being arranged in such manner that the incoming air currents take up this combined moisture and hydrocarbon content of the carbureter, the laden currents then passing through the decomposing unit where the decomposing action on the moisture content is had, thus providing for augmenting the oxygen of the charge prior to its admission to the cylinder. This particular form may also be utilized where the usual carbureting apparatus is designed to introduce a moisture content into the air currents, the location of the decomposing unit at the point indicated serving to provide the moisture decomposition.

The present invention varies the general construction and operation of the decomposing unit. The unit comprises a casing adapted to be mounted in the suction line, one or more electrode screens mounted within the casing and intersecting the flow path of the currents through the casing, and a source of electrical supply which may be in the form of a battery.

The particular form which the casing may take is more or less immaterial, the form shown in the drawings consisting of a body portion 10 and a detachable cover 11, the body portion 10 having an inlet opening 12, and an outlet 13, the casing being so arranged as to permit of ready application to the suction line with outlet 13 in open communication to the line. While inlet 12 is shown as formed direct in an end wall of the casing, it will be readily understood that both ends of the casing may be of similar construction, so that the unit may be connected up intermediate the ends of the suction line. If desired, a screen 14 may be located to intersect the entering air currents for the purpose of preventing entrance of dirt, etc., the screen, however, being so formed as to permit of the ready entrance of moisture-laden air currents.

The walls of the casing are formed to receive and position the desired number of electrode screens, the number employed being more or less dependent upon the work to be performed. In the drawings, I have shown two of these screens, but it will be readily understood that under certain conditions one screen may be sufficient, and under other conditions a considerable number may be found desirable. For instance, with an internal combustion motor of say forty horse power, I may utilize from four to six of these screens, arranged successively in the direction of length of the casing, the screens being spaced apart and preferably arranged parallel with each other. To retain the screens in desired position, any suitable means may be employed, the drawings showing such means as in the form of recesses provided on the interior of certain walls of the body portion, walls of these recesses forming guides within which the screens are readily positionable. If desired, the cover or closure may also carry positioning elements, although this is not essential, since the provision of guides on the opposite side walls of the casing will provide the desired support for the screens.

The screen-like structure, which I have termed an electrode screen, may be of any preferred construction, two general forms being indicated in the drawings. Referring first to the form shown in Fig. 4, 15 indicates a frame formed of insulating material and of any desired contour—the drawings indicating this frame as square—and of any desired thickness, as for instance one-eighth inch or less. The opposite sides of the frame are arranged to receive a plurality of wires, the means shown being in the form of openings 16 arranged relative to each other to take care of the conditions, these openings being adapted to permit the stringing of the wire so as to produce a plurality of wire strands which cross the central opening of the frame, these wires being in general parallelism—variations from absolute parallelism being permitted as long as adjacent strands are maintained out of actual contact. These strands, indicated at 17, are arranged in two groups, a strand of one group being positioned between two strands of the other group, thus causing alternate strands to be of the same group. The strands of a group are designed to be electrically connected, and for this purpose, the arrangement may be such that all of the strands of a group may be formed from a single length of wire, the latter being so strung in the frame as to provide the relative arrangement called for. In such arrangement, the two groups would be formed from two separate lengths of wire, and one end of each length will be arranged to form a terminal for that group, the two groups being electrically connected to the opposite sides of a battery. If each strand is individual, the strands of a group would be electrically connected together and to a common terminal.

These strands provide an arrangement of electrodes in which adjacent electrodes are of opposite sign, and as the strands are of wire and preferably of small cross-section, it will be readily understood that a large number of strands may be employed and yet retain the size of the screen within a comparatively small compass.

The screen may be completed in various ways, the general arrangement, however, involving the location of lengths or strands of insulating material of small cross-section in coöperative relation to the electrode strands and with the direction of length extending angular to the direction of length of the electrode strands. In the drawings, I have shown the insulating lengths or strands as extending at right angles to the direction of length of the electrode strands, the frame being arranged with a square contour, the insulating lengths or strands extending from the remaining sides of the frame. The intersecting strands or lengths are preferably interlaced, with adjacent strands reversed with respect to the strand with which intersection is had. Where, as in Fig. 4, the insulating lengths or strands are in the form of bars or lengths 20 formed integral with the frame and of small cross-section, the electrode strands are strung in such way as to provide for this interlacing effect. If the insulating strands be formed separate and strung to the frame, as in Fig. 5, either set of strands may be utilized in the interlacing operation. In either case, the intersecting strands which extend over and guard the frame opening are preferably interlaced or intermeshed, thus providing for a screen formation having a comparatively large number of mesh openings, with the strands of one direction formed of insulating material, the strands of the opposite direction being conductors of electricity, so that the entire area of the frame opening is provided with a mesh-like structure in which the circuit is normally broken and through which the air currents are required to pass, it being understood that the screen is positioned within the casing so as to cause this mesh formation to extend transverse to the direction of travel of the currents through the casing.

The terminals of each screen may be connected up to the battery in any desired manner. In the drawings I have shown a pair of binding posts 18 to which the opposite sides of a battery 19 are connected, these binding posts having portions extending into the interior of the casing, the terminals of the electrodes being electrically connected to said posts. If desired, any suitable automatic or other form of connection may be utilized; for instance, the interior of the casing may carry binding posts to which the screen terminals are secured, and the outer terminals be carried by the cover, in which case closing of the cover would bring the complemental binding posts into operative engagement and thus complete the connections. In addition, where a plurality of screens are employed, the screen terminals may be connected up in such manner as to provide for either a parallel or a series relation of the similar electrodes of the several screens.

As will be understood, the portion of each screen structure which extends into the path of travel of the air currents is small in the direction of travel of the currents, this distance being that of the thickness of the mesh formation. Hence, there is a minimum amount of obstruction to the passage of the air currents through the screen.

In operation, where the air currents are more or less moisture-laden they are forced to pass through the mesh formation of each screen. Since each mesh opening is of comparatively small area, it will be readily understood that moisture particles will be intercepted, caught up or trapped as they attempt to pass through these openings, thus producing a moisture film within the mesh opening or openings. Since the mesh opening is formed by the intersecting strands, it will be readily understood that the trapped film directly connects strands of opposite sign and thus forms a conducting medium between the two strands, with the moisture particle in its most favorable condition for decomposition which is provided by the action of the battery current, the decomposed oxygen and hydrogen being carried onward by the incoming currents. By employing a plurality of screens arranged successively in the direction of travel of the air currents, it well be readily understood that this action may take place during the passage of the air currents through either of the electrode screens, so that the possibilities of moisture particles passing through the unit without being subjected to the decomposing action is reduced to a minimum.

The electrode elements or strands may be formed of any wire or equivalent structure adapted to provide for proper electrical conduction, and should, of course, provide against the effects of moisture contact therewith. The wire is of small cross-section and may be strung so as to produce mesh openings of small area if desired, the insulating elements being arranged correspondingly. Obviously, the mesh openings may be of varying contour, as for instance, the distance between adjacent conducting or electrical elements may be small and the distance between the intersecting insulating elements be considerably wider, it being understood that moisture particles would practically be intercepted or trapped in attempting to pass between the electrodes, and this difference might extend to a point where the insulating elements are omitted, leaving the frame opening guarded by the electrode elements, but I prefer to employ the general mesh formation, in that the presence of the insulating elements not only strengthens the mesh, but in addition, tends to increase the formation of the film in a more efficient manner.

The form of the electrode elements is such that small spacing is readily had, and hence the unit is operative under low voltage conditions, although it is readily understood that the apparatus is not limited to operation under such conditions.

While I have herein shown and described various ways in which my invention may be carried into effect, it will be readily understood that changes and modifications therein may be found essential or desirable in meeting the exigencies of use, and I desire to be understood as reserving the right to make any and all such changes or modifications therein as may be found desirable or necessary, in so far as the same may fall within the spirit and scope of the invention as expressed in the accompanying claims when broadly construed.

What I claim is:—

1. In the method of producing the oxygen content of charges for power devices from moisture-laden air currents, the steps which consist in intercepting traveling moisture particles of the currents and producing a film-like formation of the intercepted particles, and subjecting the formation to decomposing treatment in the flow path of the air currents.

2. In the method of producing the oxygen content of charges for power devices from moisture-laden air currents, the step which consists in intercepting traveling moisture particles of the currents and producing a film-like formation of the intercepted particles with the support for the formation including electrodes of opposite sign, whereby completion of the film-like formation renders the electrodes active to decompose the formation into its components.

3. In the method of producing the oxygen content of charges for power devices from moisture-laden air currents, and wherein the traveling moisture particles are decomposed by the electrolytic action of an electrode system within the flow path of the currents, the step which consists in passing the laden air currents through a mesh-like element which includes the electrodes of a decomposing system to intercept the traveling moisture particles and produce a film-like formation of the intercepted particles with the formation connecting electrodes of opposite sign of the system.

4. In the art of producing the oxygen content of charges for power devices from moisture-laden air currents, a flow path for the currents, and means operative within such flow path for decomposing the moisture content of the flowing currents, said means including an electrode screen intersecting the direction of flow of the air currents.

5. In the art of producing the oxygen content of charges for power devices from moisture-laden air currents, a flow path for the currents, and means operative within such flow path for decomposing the moisture content of the flowing currents, said means including a plurality of electrode screens each intersecting the direction of flow of the air currents and spaced apart in the direction of flow.

6. In the art of producing the oxygen content of charges for power devices from moisture-laden air currents, a flow path for the currents, and means operative within such flow path for decomposing the moisture content of the flowing currents, said means including a decomposing unit comprising a casing forming a section of such flow path, a plurality of electrode screens located in spaced apart relation within the casing with each screen extending transverse to the direction of flow of the air currents through the casing, each screen having electrode terminals, and means for connecting the several electrode terminals to a source of electrical supply to produce an electrode system.

7. In the art of producing the oxygen content of charges for power devices from moisture-laden air currents, a flow path for the currents, and means operative within such flow path for decomposing the moisture content of the flowing currents, said means including a decomposing unit comprising a casing forming a section of such flow path, a plurality of electrode screens located in spaced-apart relation within the casing with each screen extending transverse to the direction of flow of the air currents through the casing, each screen having electrode terminals, guides for removably supporting the screens within the casing, a removable cover for the casing, and means whereby the several electrode terminals may be electrically connected to a source of electrical supply.

8. As a new article of manufacture, an electrode screen comprising a frame of insulating material, two groups of electrode elements bridging an opening of the frame in approximately parallel relation, and insulating elements coöperating with said electrode elements to produce a mesh-like formation guarding said frame opening.

9. As a new article of manufacture, an electrode screen comprising a frame of insulating material, and a mesh-like formation guarding said screen opening, said formation including electrode elements of opposite sign.

10. As a new article of manufacture, an electrode screen comprising a frame of insulating material, and a mesh-like formation guarding the frame opening, the formation including parallel electrodes of opposite sign, with electrodes of one sign interspaced with respect to electrodes of the opposite sign.

11. As a new article of manufacture, an electrode screen comprising a frame of insulating material, and a mesh-like formation guarding the frame opening, the formation including parallel electrode elements arranged in alternation, the walls of each mesh opening including an element of each sign.

12. As a new article of manufacture, an electrode screen comprising a frame of insulating material, and a mesh structure guarding the opening of said frame, said structure including parallel wire elements arranged in two groups of opposite electrical sign with the elements of each group of the same sign, and insulating elements intersecting said wire elements to complete the mesh formation.

13. As a new article of manufacture, an electrode screen comprising a frame of insulating material, and a mess structure guarding the opening of said frame, said structure including parallel wire elements arranged in two groups of opposite electrical sign with the elements of each group of the same sign, and insulating elements intersecting said wire elements to complete the mesh formation, said wire and insulating elements extending in interlaced relation.

In testimony whereof I have hereunto set my hand.

HENRY CSANYI.